United States Patent
Baldwin

(10) Patent No.: US 11,323,549 B2
(45) Date of Patent: *May 3, 2022

(54) DELIVERY OF MEDIA CONTENT TO A MEDIA DEVICE VIA MULTIPLE DATA PACKET STREAMS

(71) Applicant: AT&T Intellectual Property I, L.P., Atlanta, GA (US)

(72) Inventor: Christopher Baldwin, Algonquin, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/227,496

(22) Filed: Apr. 12, 2021

(65) Prior Publication Data

US 2021/0234943 A1 Jul. 29, 2021

Related U.S. Application Data

(63) Continuation of application No. 15/862,423, filed on Jan. 4, 2018, now Pat. No. 11,005,976, which is a
(Continued)

(51) Int. Cl.
*H04L 29/06* (2006.01)
*H04L 69/14* (2022.01)
(Continued)

(52) U.S. Cl.
CPC .......... *H04L 69/14* (2013.01); *H04L 65/4084* (2013.01); *H04L 65/602* (2013.01); *H04L 65/80* (2013.01)

(58) Field of Classification Search
CPC ... H04L 69/14; H04L 65/4084; H04L 65/602; H04L 65/80
See application file for complete search history.

(56) References Cited

U.S. PATENT DOCUMENTS 6,049,551 A 4/2000 Hinderks et al.
6,778,495 B1 8/2004 Blair
(Continued)

OTHER PUBLICATIONS

Bahl, P. et al., "SSCH: Slotted Seeded Channel Hopping for Capacity Improvement in IEEE 802.11 Ad-Hoc Wireless Networks", MobiCom '04, Sep. 26-Oct. 1, 2004, 2004, 15 pages.
(Continued)

*Primary Examiner* — Viet D Vu
(74) *Attorney, Agent, or Firm* — Guntin & Gust, PLC; Kenneth Kwan

(57) ABSTRACT

A method includes receiving, at a customer premises equipment (CPE) device from a data source, media content requested by a media device. The method includes determining, at the CPE device, a number of concurrent media connections to establish to the media device based on a workload of the customer premises device. The method includes establishing the number of concurrent communication connections between the CPE device and the media device. The method also includes sending the media content as data packets via data packet streams to the media device from the customer premises equipment device. A data packet stream of the data packet streams is sent via each communication connection of the concurrent communication connections. Each data packet stream includes less than all data packets of the media content, and the media device processes the data packets received via the data packet streams to generate media content output.

20 Claims, 7 Drawing Sheets

Related U.S. Application Data continuation of application No. 13/671,775, filed on Nov. 8, 2012, now Pat. No. 9,900,408.

(51) Int. Cl.
*H04L 65/612* (2022.01)
*H04L 65/60* (2022.01)
*H04L 65/80* (2022.01)

(56) References Cited

U.S. PATENT DOCUMENTS

| | | | |
|---|---|---|---|
| 7,453,843 | B2 | 11/2008 | Mowery et al. |
| 7,769,021 | B1 | 8/2010 | Chen et al. |
| RE42,002 | E | 12/2010 | Riceman et al. |
| 7,894,828 | B2 | 2/2011 | Dawson et al. |
| 8,170,056 | B2 | 5/2012 | Allen et al. |
| 8,400,923 | B2 | 3/2013 | Kini |
| 8,463,929 | B2 | 6/2013 | Hiie et al. |
| 8,611,251 | B2 | 12/2013 | Subramanian et al. |
| 8,792,349 | B2 | 7/2014 | Sarkar |
| 8,832,726 | B2 | 9/2014 | Adimatyam et al. |
| 8,843,983 | B2 | 9/2014 | Gronning |
| 9,197,505 | B1 | 11/2015 | Hill |
| 2002/0143965 | A1 | 10/2002 | Aiken |
| 2004/0152422 | A1 | 8/2004 | Hoglund et al. |
| 2005/0025150 | A1 | 2/2005 | Helmy et al. |
| 2008/0285578 | A1 | 11/2008 | Delay et al. |
| 2009/0022172 | A1 | 1/2009 | Haberman et al. |
| 2009/0024991 | A1* | 1/2009 | Campbell ............... H04L 67/06 717/173 |
| 2009/0147793 | A1 | 6/2009 | Hayakawa et al. |
| 2009/0182846 | A1 | 7/2009 | Bowler |
| 2010/0208609 | A1 | 8/2010 | Sundarraman et al. |
| 2010/0302968 | A1* | 12/2010 | Lu .......................... H04W 24/08 370/252 |
| 2012/0260296 | A1 | 10/2012 | Mallet et al. |
| 2013/0024901 | A1 | 1/2013 | Sharif-Ahmadi et al. |
| 2013/0111055 | A1 | 5/2013 | Chang |
| 2013/0279331 | A1 | 10/2013 | Pluntke et al. |
| 2014/0040364 | A1 | 2/2014 | Baldwin et al. |
| 2014/0101758 | A1* | 4/2014 | Ludin .................... H04L 47/22 726/22 |
| 2014/0258365 | A1 | 9/2014 | L'heureux et al. |

OTHER PUBLICATIONS

Derfler, Jr. et al., "How Networks Work", Que Publishing, 7th Edition, 2005, 4 pages.

Iyengar, J. et al., "Concurrent Multipath Transfer Using SCTP Multihoming Over Independent End-to-End Paths", IEEE/ACM Transactions on Networking, vol. 15, No. 5, Oct. 2006, 14 pages.

Sarkar, D. et al., "Architecture, Implementation, and Evaluation of cmpTCP Westwood", Global Telecommunications Conference, GLOBECOM '06, IEEE, 2006, 5 pages.

Tanebaum, A. S., "Computer Networks, Fourth Edition", Prentice Hall, Upper Saddle River, N.J., 2003, 4 pages.

* cited by examiner

DELIVERY OF MEDIA CONTENT TO A MEDIA DEVICE VIA MULTIPLE DATA PACKET STREAMS

CROSS-REFERENCE TO RELATED APPLICATIONS

This application is a continuation of and claims priority to U.S. patent application Ser. No. 15/862,423, filed Jan. 4, 2018 (now U.S. Pat. No. 11,005,976), which is a continuation of and claims priority to U.S. patent application Ser. No. 13/671,775, filed Nov. 8, 2012 (now U.S. Pat. No. 9,900,408), all of which are incorporated herein by reference in their entirety.

FIELD OF THE DISCLOSURE

The present disclosure is generally related to delivery of media content to a media device via multiple data packet streams.

BACKGROUND

A service provider may provide different service levels to customers. The service level of a customer may be expressed in terms of a maximum bandwidth available to the customer. Customers may have customer premises equipment (CPE) devices that establish local area networks that enable multiple devices to use available bandwidth. Devices coupled to a local area network (LAN) may communicate by wired connections, wireless connections, or both. Some activities performed by devices of the LAN may be bandwidth intensive activities. For example streaming video (e.g., standard definition video and high definition video) to a television or display of a computing device may be a bandwidth intensive activity. A connection to a CPE device of a customer by a networked device may provide an unsatisfactory experience for a customer when the one or more bandwidth intensive activities are occurring even though the service level of the customer is sufficient to support the one or more bandwidth intensive activities.

DETAILED DESCRIPTION

Figure 1:
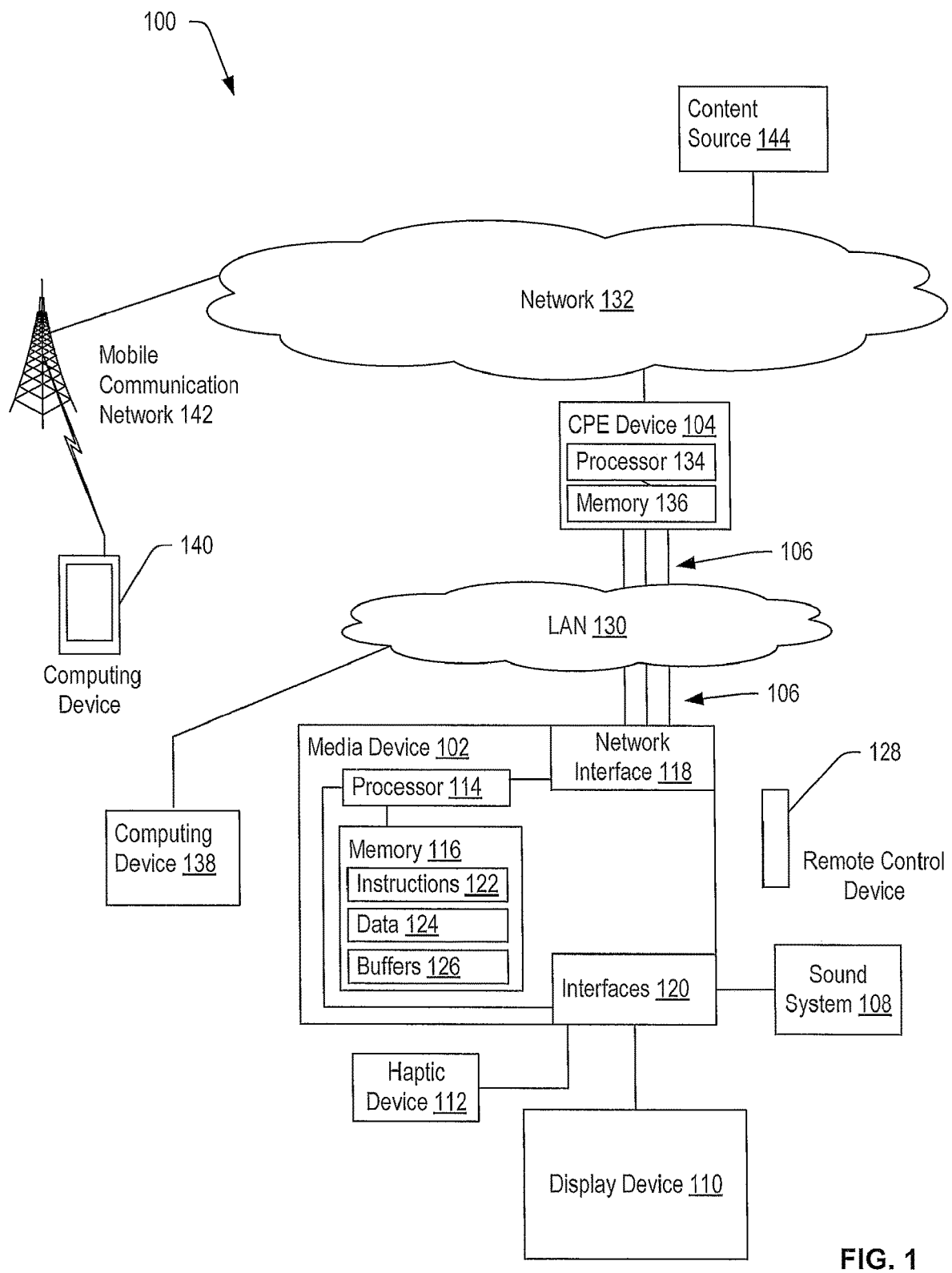
FIG. 1 is a block diagram of a first embodiment of a system for delivery of media content to a media device via multiple data packet streams.

A media device (e.g., a set-top box device, a television, or a computer system) coupled to a local area network may make multiple concurrent connections to a customer premises equipment (CPE) device to increase available bandwidth for downloading media content to the media device. The CPE device may send the media content as data packets to the media device via data packet streams. Each data packet stream may include a portion of the media content. The media device may process the portions of the media content received from the data packet streams to output of the media content for one or more devices (e.g., to a sound system and a display device). Sending the data streams to the media device via multiple concurrent connections may reduce a bandwidth bottleneck between the CPE device and the media device. Sending the data streams to the network device via multiple concurrent connections may increase satisfaction with playback of the media content by reducing a time needed to buffer a sufficient portion of the media content to enable the media content to be played and by inhibiting underflow of the buffer during playback of the media content.

In a particular embodiment, a method includes receiving a request for media content at a customer premises equipment device. The media content is to be sent to a media device. The method includes retrieving the media content to the customer premises equipment device from a data source in response to the request. The method includes establishing two or more concurrent communication connections between the customer premises equipment device and the media device. The method also includes sending the media content as data packets via data packet streams to the media device from the customer premises equipment device. A data packet stream of the data packet streams is sent via each communication connection of the two or more concurrent communication connections, and each data packet stream includes less than all data packets of the media content. The media device is configured to process the data packets received via the data packet streams to output of the media content for one or more devices.

In a particular embodiment, a system includes a processor and a memory accessible to the processor. The memory includes instructions executable by the processor to receive a request for media content for a media device. The memory includes instructions executable by the processor to establish two or more concurrent communication connections to the media device. The memory also includes instructions executable by the processor to send the media content as data packets via data packet streams to the media device. A data packet stream of the data packet streams is sent via each communication connection of the two or more concurrent communication connections, and each data packet stream includes less than all data packets of the media content. The media device is configured to process the data packets received via the data packet streams to output of the media content for one or more devices.

In a particular embodiment, a computer-readable storage device includes instructions that, when executed by a processor, cause the processor to perform a method. The method includes sending a request for media content to a customer premises equipment device. The method includes establishing two or more concurrent communication connections to the customer premises equipment device in response to the request. The method includes receiving a data packet stream of data packets from the customer premises equipment device via each communication connection of the two or more concurrent communication connections. The media content is divided among the data packets such that the data packets of each individual data packet stream sent from the customer premises equipment device are insufficient to produce the media content. The method may also include processing the data packets received via the two or more concurrent communication connections to output the media content to one or more devices.

FIG. 1 is a block diagram of a first embodiment of a system 100 to deliver media content to a media device 102 via multiple data packet streams. A customer premises equipment (CPE) device 104 may send the media content to the media device 102 as multiple data packet streams via two or more concurrent communication connections 106 between the CPE device 104 and the media device 102. The concurrent communication connections 106 may include wireline connections (e.g., wired connections or fiber optic connections), wireless connections, or both.

The media content may include video content (e.g., standard definition video content or high definition video content of a television program, movie, videoconference, etc), audio content, internet content, other types of content, or combinations thereof. In an embodiment, the media content may be on-demand content requested from a service provider of entertainment and/or educational materials, such as NETFLIX®.

In the embodiment depicted in FIG. 1, three concurrent communication connections 106 between the media device 102 and the CPE device 104 deliver data packet streams of the media content to the media device 102. In other embodiments, two concurrent communication connections 106 or more than three concurrent communication connections 106 between the media device 102 and the CPE device 104 may deliver the media content to the media device 102.

The media device 102 may receive multiple data packet streams from the CPE device 104 via the concurrent communication connections 106. Each data packet stream may include a portion of data packets needed to produce the media content. In an embodiment, the data packets needed to produce the media content are divided into n data packet blocks, DPBs. Each DPB may have one or more data packets. The DPBs may be uniform in size or may have different sizes. The DPBs may be alternated among j data packet streams, DPS, sent via j concurrent communication connections 106. The DPBs in each data packet stream, $DPS_x$, may be provided the following equation:

$$DPS_x = \{DPB_x, DPB_{xj+1}, \ldots DPB_{(n-j+x-1)+1}\} \quad \text{(Eqn 1)}$$

In some embodiments, one or more particular communication connections of the two or more concurrent communication connections 106 may have greater bandwidth than other communication connections of the two or more concurrent communication connections 106. For example, one of the communication connections may be a wired connection that has greater bandwidth than another communication connection that is a wireless connection. The media content may be divided among the two or more concurrent communication connections 106 such that the one or more particular communication connections with greater bandwidth carry more data packets of the media content than the other communication connections with less bandwidth.

Data packet payloads from two or more of the data packet streams may need to be combined to enable a segment of media content that a user hears, sees, or senses to be output from one or more devices. The devices may include, but are not limited to, a sound system 108, a display device 110, a haptic device 112, other sensory device, or combinations thereof. The haptic device 112 may be a controller (e.g., a game controller) or other device that provides tactile feedback to a user. The data packets from the data packet streams may be aggregated, ordered, and processed to output of the media content (e.g., video output, audio output, and haptic output) for the one or more the devices 108, 110, 112.

The media device 102 may be a set-top box device, an internet capable television, a personal computer, a laptop computer, another computing device, or combinations thereof, that is capable of establishing the two or more concurrent communication connections 106 to the CPE device 104. The media device 102 may include a processor 114, a memory 116, a network interface 118, and interfaces 120. The memory 116 may include instructions 122 executable by the processor 114 to perform tasks, such as sending the media content received as data packets via two or more concurrent communication connections 106 as output to one or more of the devices 108, 110, 112. The memory 116 may include data 124. The data 124 may include stored media content, preferences, user profiles, and other data used by the processor 114 during performance of the tasks. The memory 116 may include one or more buffers 126. The buffers 126 may temporarily store incoming data packets during ordering of the data packets. The buffers 126 may also temporarily store portions of output produced by the processor 114 from payloads of the data packets before the output is sent by the processor 114 to one or more of the devices 108, 110, 112, stored by the processor 114 for later retrieval in the data 124, or both.

The network interface 118 may enable the media device 102 to communicate with one or more external devices via the CPE device 104. The network interface 118 may include a number of ports. The multiple concurrent communication connections 106 for sending data packet streams of the media content from CPE device 104 to the media device 102 may be established between the CPE device 104 and individual ports of the network interface 118.

The interfaces 120 may enable the media device 102 to receive input from devices coupled to the media device 102 (e.g., the haptic device 112 and a remote control device 128) and to send output to one or more devices coupled to the media device 102 (e.g., the sound system 108, the display device 110, the haptic device 112, and the remote control device 128). The devices coupled to the media device 102 may be integral components of the media device 102, the devices coupled to the media device 102 may be removably coupled to the media device 102 (e.g., by wireline connections or by wireless connections), or some of the devices coupled to the media device 102 may be integral components of the media device 102 and some of the devices coupled to the media device 102 may be removably coupled to the media device 102.

Devices coupled to the media device 102 that provide input to the media device 102 (e.g., the remote control device 128, the haptic device 112, a mouse, a touch pad, a touch screen, a telecommunication device, etc.) may enable a user of the media device 102 to select the media content that is to be sent to the media device 102. The user may select the input from an electronic program guide, from a listing of available media content from one or more sources, or from another form of presentation of available media content.

Devices coupled to the media device 102 that receive output from the media device 102 (e.g., the sound system 108, the display device 110, and the haptic device 112) may enable the user to experience the media content sent to the media device 102. In an embodiment, the processor 114 of the media device 102 may process the data packets received via the data packet streams to video output and audio output. The processor 114 may send the video output to the display device 110. The audio output may be sent by the processor 114 to the sound system 108 when the audio output is not muted. The sound system 108 may include speakers that are integral components of the display device 110 as well as multiple speakers of a stereo system coupled to the media device 102. When the haptic device 112 is coupled to the media device 102 and the media content includes haptic output, haptic output processed from the data packets may be sent to the haptic device 112. Other outputs of the media content may be sent to appropriate devices.

The CPE device 104 may facilitate communications between devices of a local area network (LAN) 130 established by the CPE 104. The CPE device 104 may also facilitate communications between devices of the LAN 130 and devices external to the LAN 130 that are coupled to the CPE device 104 by a network 132 (e.g., a public wide area network such as the internet). The CPE device 104 may include at least one processor 134 and at least one memory 138 coupled to the at least one processor 134. The at least one memory 138 may include instructions executable by the at least one processor 134 to perform tasks. In the embodiment depicted in FIG. 1, the at least one processor 134 of the CPE device 104 is able to perform the task of dividing received media content into two or more data packet streams of data packets.

A request that the media content be sent to the media device 102 may be received by the CPE device 104. The request may be received from the media device 102 or from a different device. The different device may be a computing device 138 (e.g., a desktop computer, laptop computer, tablet computer, mobile communication device, etc.) that is part of the LAN 130 or a computing device 140 (e.g., a desktop computer, laptop computer, tablet computer, mobile communication device, etc.) that is coupled to the CPE device 104 via the network 132 or via a mobile communication network 142 and the network 132. The request may identify the media content and a source of the media content. The source of the media content may be a device that is part of the LAN 130 (e.g., the computing device 138) or a content source 144 coupled to the CPE device 104 by the network 132. The source of the media content may send the media content to the CPE device 104. The media content may be sent to the CPE device 104 from the source as data packets in a data packet stream.

The at least one processor 134 of the CPE device 104 may determine a particular number of concurrent communication connections 106 to establish between the CPE device 104 and the media device 102 for delivery of the media content to the media device 102. The at least one processor 134 may determine the particular number based on a number of concurrent connections that the CPE device 104 can support, based on a number of communication connections the CPE device 104 is currently maintaining (e.g., a work load of the CPE device 104), based on a number of connections established between the CPE device 104 and the media device 102 for purposes not related to the media content (e.g., a work load of the media device 102), based on a number of concurrent connections that the media device 102 can accept, based on other factors, or combinations thereof.

The at least one processor 134 may communicate with the media device 102 and establish the concurrent communication connections 106 between the CPE device 104 and the media device 102 to carry data streams of the media content to the media device 102. The concurrent communication connections 106 may include a communication connection used to send the request for the media content from the media device 102 to the CPE device 104 when the request is sent to the CPE device 104 from the media device 102.

The at least one processor 134 may send the media content to the media device 102 as data packets in data packet streams. Each of the concurrent communication connections 106 may carry a data packet stream of the data packet streams to the media device 102. The at least one processor 134 may divide the media content received from the source of the media content among the data packet streams. The media device 102 may receive the data packet streams, aggregate data packets of the data packet streams, order the data packets, and process the data packets to produce output of the media content. The CPE device 104 may change the number of the concurrent communication connections 106 during transmission of the media content to the media device 102 due to changing conditions, such as additional or decreased work load demands made of the CPE device 104, the media device 102, or both.

Figure 2:
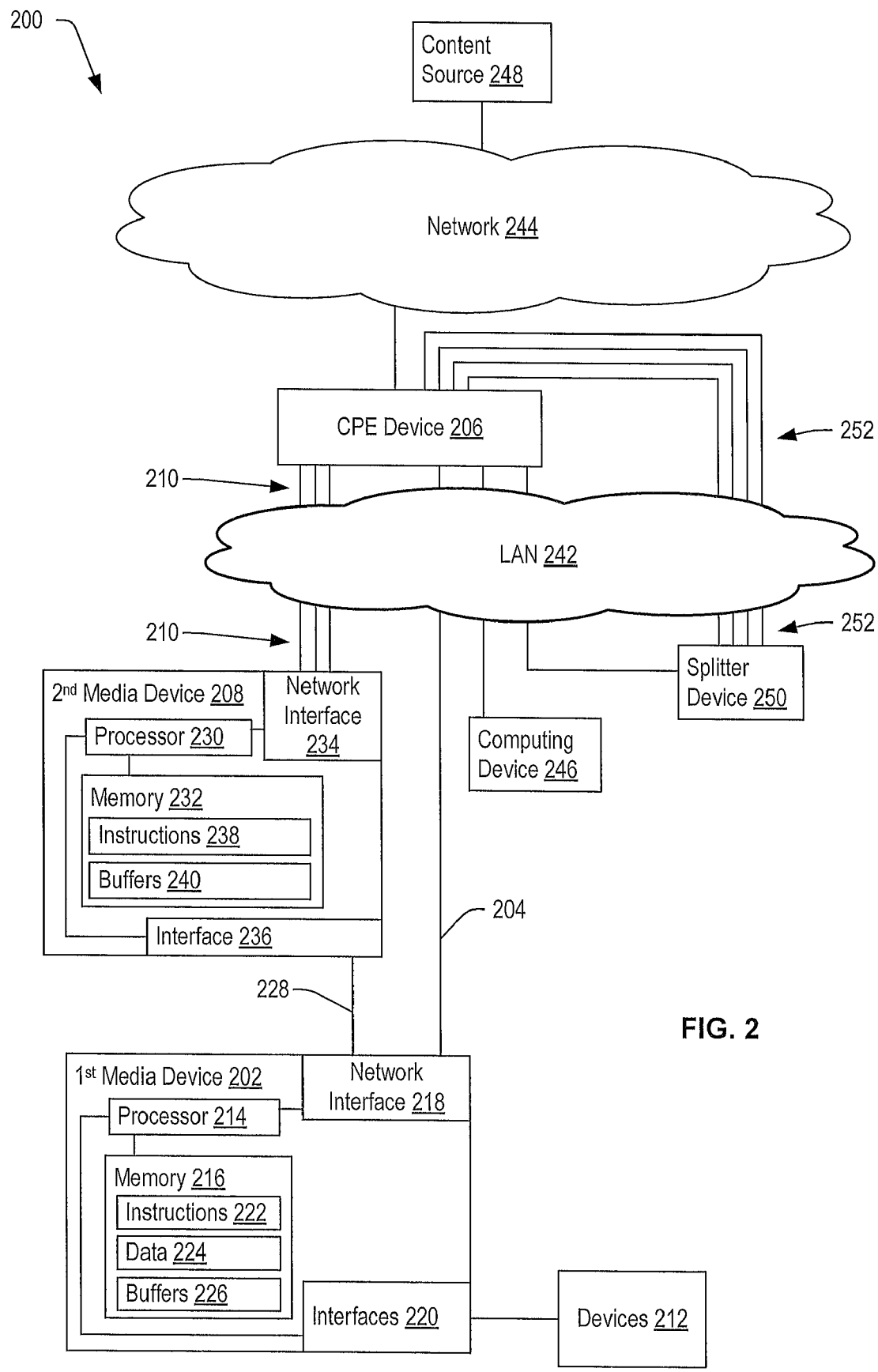
FIG. 2 is a block diagram of a second embodiment of a system for delivery of media content to a media device via multiple data packet streams.

FIG. 2 is a block diagram of a second embodiment of a system 200 to deliver media content to a first media device 202 via multiple data packet streams. The first media device 202 may establish a single communication connection 204 to a CPE device 206. When the CPE device 206 receives a request for the media content, a first data packet stream of data packets of the media content may be sent to the first media device 202 by the CPE device 206 via the single communication connection 204. One or more second data packet streams of the media content may be sent to a second media device 208 via one or more communications connections 210 between the CPE device 206 and the second media device 208 that are concurrent with the single communication connection 204. Each data packet stream of the first data packet stream and the one or more second data packet streams may include a portion of the data packets needed to produce the media content. The data packets sent to the first media device 202 via the first data packet stream and the data packets sent to the second media device 208 via the one or more second data packet streams may need to be aggregated, ordered, and processed to produce output of the media content for one or more devices 212 coupled to the first media device 202. The devices 212 may include, but are not limited to, a display device, a sound system, a haptic device, or combinations thereof.

The first media device 202 may be a set-top box device, an internet capable television, a personal computer, a laptop computer, tablet computer, mobile communication device, other computing device, or combinations thereof that is capable of establishing the single communication connection 204 to the CPE device 206. The first media device 202 may include a processor 214, a memory 216, a network interface 218, and interfaces 220. The memory 216 may include instructions 222 executable by the processor 214 to perform tasks, such as receiving a portion of the media content as data packets via the single communication connection 204. The memory may include data 224. The data 224 may include stored media content, preferences, user profiles, and other data used by the processor 214 during performance of the tasks. The memory 216 may include one or more buffers 226. The buffers 226 may temporarily store incoming data packets. The buffers 226 may also temporarily store portions of output produced by the processor 214 before the output of the media content is sent by the processor 214 to one or more of the devices 212, stored by the processor 214 for later retrieval in the data 224, or both.

The network interface 218 may enable the first media device 202 to communicate with one or more external devices via the single communication connection 204 to the CPE device 206. The network interface 218 may also enable the first media device 202 to communicate with the second media device 208 via a wireline 228 (e.g., a fiber optic cable or an Ethernet cable).

In an embodiment, the processor 214 sends data packets of the media content received via the single communication connection 204 to the second media device 208 via the wireline 228. The second media device 208 aggregates data packets of the media content received via the one or more connections 210, orders the data packets, and sends a media content data packet stream back to the first media device 202 via the wireline 228. The processor 214 processes payloads of data packets of the media content data packet stream to the output of the media content that is sent to one or more of the devices 212. In an embodiment, data packets of the media content received by the second media device 208 are sent via the wireline 228 to the first media device 202. The processor 214 may aggregate the data packets received via the wireline 228 with data packets received via the single communication connection 204, order the aggregated data packets, and process the ordered data packets to the output of the media content that is sent to one or more of the devices 212. In another embodiment, a third device (not shown) receives the data packets of the media content received by the first media device 202 via the single communication connection 204 and the data packets received by the second media device 208 via the one or more connections 210. The third device may aggregate the received data packets, order the aggregated data packets, and send the ordered data packets to the first media device 202 to be processed by the processor to the output of the media content that is sent to one or more of the devices 212.

The interfaces 220 may enable the first media device 202 to receive input from one or more of the devices 212 coupled to the first media device 202 (e.g., a remote control device, a mouse, a touch pad, a touch screen, a telecommunication device, etc.). The interfaces 220 may also enable the first media device 202 to send the output of the media content to one or more of the devices 212 coupled to the first media device 202 (e.g., a display device, a sound system, etc).

The second media device 208 may include a processor 230, a memory 232, a network interface 234, and an interface 236. The memory 232 may include instructions 238 executable by the processor 214 to perform tasks, such as receiving a portion of the media content as data packets via the one or more communication connections 210. The memory 232 may include one or more buffers 240. The buffers 240 may temporarily store incoming data packets received via the one or more connections 210, data packets received via the wireline 228, or both.

The network interface 234 may include a number of ports. The one or more communication connections 210 for sending data packet streams of the media content from the CPE device 206 to the second media device 208 may be established between the CPE device 206 and individual ports of the network interface 234. The interface 236 may enable the second media device 208 to be coupled to the first media device 202 by the wireline 228.

The CPE device 206 may facilitate communications between devices of a local area network (LAN) 242 established by the CPE device 206. The CPE device 206 may also facilitate communications between devices of the LAN 242 and devices external to the LAN 242 that are coupled to the CPE device 206 by a network 244.

A request that the media content be sent to the first media device 202 may be received by the CPE device 206. The request may be received from the first media device 202 or from a different device (e.g., a computing device 246 of the LAN 242, such as a desktop computer, laptop computer, tablet computer, mobile communication device, etc.). The request may identify the media content and a source of the media content. The source of the media content may be a device of the LAN 242 (e.g., the computing device 246) or a content source 248 coupled to the CPE device 206 by the network 244. The source of the media content may send the media content to the CPE device 206. The media content may be sent to the CPE device 206 from the source as data packets in a data packet stream.

In the embodiment depicted in FIG. 2, the CPE device 206 is not able to divide media content received from the source of the media content into two or more data packet streams of data packets. Instead of the CPE device 206 dividing the media content into the two or more data packet streams, the CPE device 206 determines a particular number of data packet streams that are to be sent to the first media device 202 and the second media device 208, and sends a split request to a splitter device 250. The CPE device 206 may also send the media content to the splitter device 250. The split request may identify the media content to be split and may indicate the particular number of data packet streams.

The splitter device 250 may receive the request and the media content from the CPE device 206. The splitter device 250 may divide the media content into the particular number of data packet streams. The splitter device 250 may establish the particular number of concurrent communication connections 252 to the CPE device 206. The splitter device 250 may send a data packet stream of the data packet streams to the CPE device 206 via each of the concurrent communication connections 252.

In an embodiment, the splitter device 250 is a computing device (e.g., a personal computer) that includes software that enables the splitter device to divide the media content into the data packet streams and establish the concurrent communication connections 252 to the CPE device 206. When the source of the media content is the splitter device 250, the split request may identify that the splitter device 250 is the source of the media content. When the split request indicates that the splitter device 250 is the source of the media content, the splitter device 250 may process the media content into the data packet streams without sending the media content to the CPE device 206 and receiving the media content back from the CPE device 206. In another embodiment, the splitter device 250 is an application specific device for dividing the media content into the data packet streams and establishing the concurrent communication connections 252 with the CPE device 206.

The CPE device 206 receives the data packet streams via the concurrent communication connections 252 from the splitter device 250. The CPE device 206 sends a first data packet stream of the data packet streams to the first media device 202 via the single communication connection 204. The CPE device 206 sends the remaining data packet streams to the second media device 208 via the second communication connections 210. The data packets sent to the first media device 202 and the second media device 208 may be aggregated, ordered, and processed to output for one or more of the devices 212.

Figure 3:
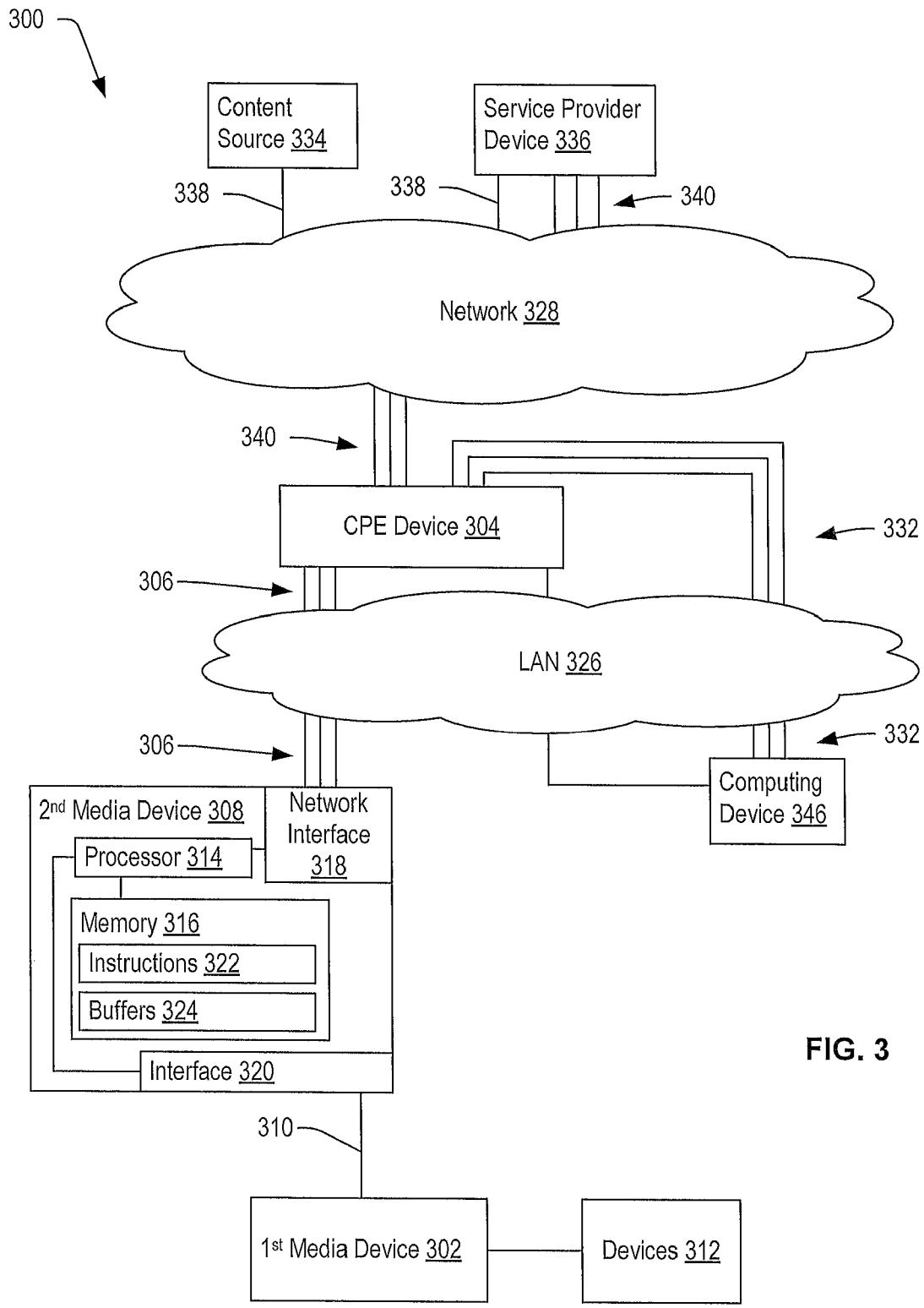
FIG. 3 is a block diagram of a third embodiment of a system for delivery of media content to a media device via multiple data packet streams.

FIG. 3 is a block diagram of a third embodiment of a system 300 to deliver media content to a first media device 302 via multiple data packet streams. The first media device 302 may be a set-top box device, a television, a personal computer, a laptop computer, other computing device, or combinations thereof. When a CPE device 304 receives a request to send the media content to the first media device 302, the CPE device 304 may establish multiple concurrent communication connections 306 with a second media device 308. The CPE device 304 may send the media content as data packet streams of data packets to the second media device 308. A data packet stream may be sent via each communication connection of the multiple concurrent communication connections 306. Each data packet stream sent to the second media device 308 may include data packets of a portion of the media content that is insufficient to reproduce the media content. Data packets from the data packet streams may need to be aggregated, ordered, and processed to produce output of the media content.

The second media device 308 may aggregate the data packets received from the data packet streams, order the data packets, and send the aggregated and ordered data packets to the first media device 302 via a connection 310. The connection 310 may be a wireline connection (e.g., a fiber optic cable or an Ethernet cable). The first media device 302 may process the aggregated and ordered data packets received via the connection 310 to output of the media content that is sent to one or more of devices 312 coupled to the first media device 302. The devices 312 may include, but are not limited to, a display device, a sound system, a haptic device, or combinations thereof.

The second media device 308 may be a connectivity device that is capable of establishing the multiple concurrent communication connections 306 to the CPE device 304. The second media device 308 may include a processor 314, a memory 316, a network interface 318, and an interface 320. The memory 316 may include instructions 322 executable by the processor 314 to perform tasks, such as receiving the data packets via the multiple concurrent communication connections 306, aggregating the data packets, ordering the data packets, and sending the data packets to the first media device 302 via the connection 310. The memory 316 may also include one or more buffers 324. The buffers 324 may temporarily store incoming data packets during aggregation and ordering of the data packets.

The network interface 318 may enable the second media device 308 to communicate with one or more external devices via the CPE device 304. The network interface 318 may include a number of ports. The multiple concurrent communication connections 306 for sending data packet streams of the media content from CPE device 304 to the second media device 308 may be established between the CPE device 304 and individual ports of the network interface 318. The network interface 318 may receive input for the first media device 302. The processor 314 may forward input for the first media device 302 to the first media device 302 via the interface 320.

The interface 320 may enable the second media device 308 to receive input from the first media device 302. Input from the first media device 302 may be forwarded to the CPE device 304 via a communication connection established between the network interface 318 and the CPE device 304. The interface 320 may also enable the second media device 308 to send aggregated and ordered data packets of the media content to the first media device 302.

The CPE device 304 may facilitate communications between devices of a local area network (LAN) 326 established by the CPE device 304. The CPE device 304 may also facilitate communications between devices of the LAN 326 and devices external to the LAN 326 that are coupled to the CPE device 304 by a network 328.

A request that the media content be sent to the first media device 302 may be received by the CPE device 304. The request may be received from the first media device 302 via the second media device 308 or from a different device. The request may include a source of the media content.

When the source identified in the request is a computing device 346 (e.g., a desktop computer, laptop computer, tablet computer, etc.) coupled to the LAN 326, the CPE device 304 may determine whether the computing device 346 is capable of sending the media content to the CPE device 304 via multiple data packet streams. The determination may be made by accessing data regarding capabilities of devices coupled to the CPE device 304, by communications between the CPE device 304 and the computing device 346 regarding the capabilities of the computing device 346, by other technique, or by combinations thereof. When the determination is that the computing device 346 is capable of sending the media content via multiple data packet streams, the CPE device 304 may send a media content request to the computing device 346. The media content request may specify the media content and a number of data packet streams containing portions of the media content that are to be sent to the CPE device 304. The CPE device 304 may establish the number of concurrent communication connections 306 between the CPE device 304 and the second media device 308.

In response to the media request, the computing device 346 may establish the number of concurrent communication connections 332 with the CPE device 304. The computing device 346 may divide the media content into data packet streams of data packets and send a data packet stream via each communication connection of the communication connections 332 to the CPE device 304. The CPE device 304 may forward the data packet streams received via the concurrent communication connections 332 to the second media device 308 via corresponding concurrent communication connections 306. The second media device 308 may aggregate received data packets, order the data packets, and send the ordered data packets to the first media device 302. The first media device 302 may process the data packets received from the second media device 308 to produce output of the media content that is sent to one or more of the devices 312.

When the source identified in the request is a content source 334 accessed via the network 328, the CPE device 304 may determine whether the content source 334 or a service provider device 336 is capable of sending the media content to the CPE device 304 divided among multiple data packet streams. For example, after receiving the request for the media content, the CPE device 304 may access a memory of the CPE device 304 that provides information that the service provider device 336 is able to provide the media content to the CPE device 304 via multiple data packet streams.

When the determination indicates that the media content may be obtained as multiple data packet streams, the CPE device 304 may determine a particular number of concurrent communication connections 306 to establish between the CPE device 304 and the second media device 308 for delivery of the media content to the first media device 302. The CPE device may determine the particular number based on a number of concurrent connections that the CPE device 304 can support, based on a number of communication connections the CPE device 304 is currently maintaining (e.g., a work load of the CPE device 304), based on a number of connections established between the CPE device 304 and the second media device 308 for purposes not related to the media content (e.g., a work load of the second media device 308), based on a number of concurrent connections that the second media device 308 can accept, based on other factors, or combinations thereof. The CPE device 304 may communicate with the second media device 308 and establish the concurrent communication connections 306 to carry the media content to the second media device 308.

The CPE device 304 may also send a media content request to receive the media content in multiple data packet streams with the data packets divided among the data packet streams to a device that the CPE device 304 determined is able to provide the media content in multiple data packet streams. The media content request may specify a number of data packet streams that are to carry the media content to the CPE device 304. When the service provider device 336 is to provide the media content in multiple data packet streams, the service provider device 336 may receive the media content request. In response to the media content request, the service provider device 336 may request the media content from the content source 334 via a communication connection 338, receive the media content from the content source 334 via the communication connection 338, divide data packets of the received media content among the number of data packet streams, and send the data packet streams to the CPE device 304 via communication connections 340. In an embodiment where the media content is sent to the content source 334, the content source 334 sends the media content to the CPE device 304 as data packet streams with the media content divided among the data packet streams.

The CPE device 304 forwards data packet streams of the media content received in response to the media request (e.g., the data packet streams received via the communication connections 340) to the second media device 308 via the concurrent communication connections 306. The second media device 308 may aggregate received data packets, order the data packets, and send the ordered data packets to the first media device 302. The first media device 302 may process the data packets received from the second media device 308 to produce output of the media content that is sent to one or more of the devices 312.

Figure 4:
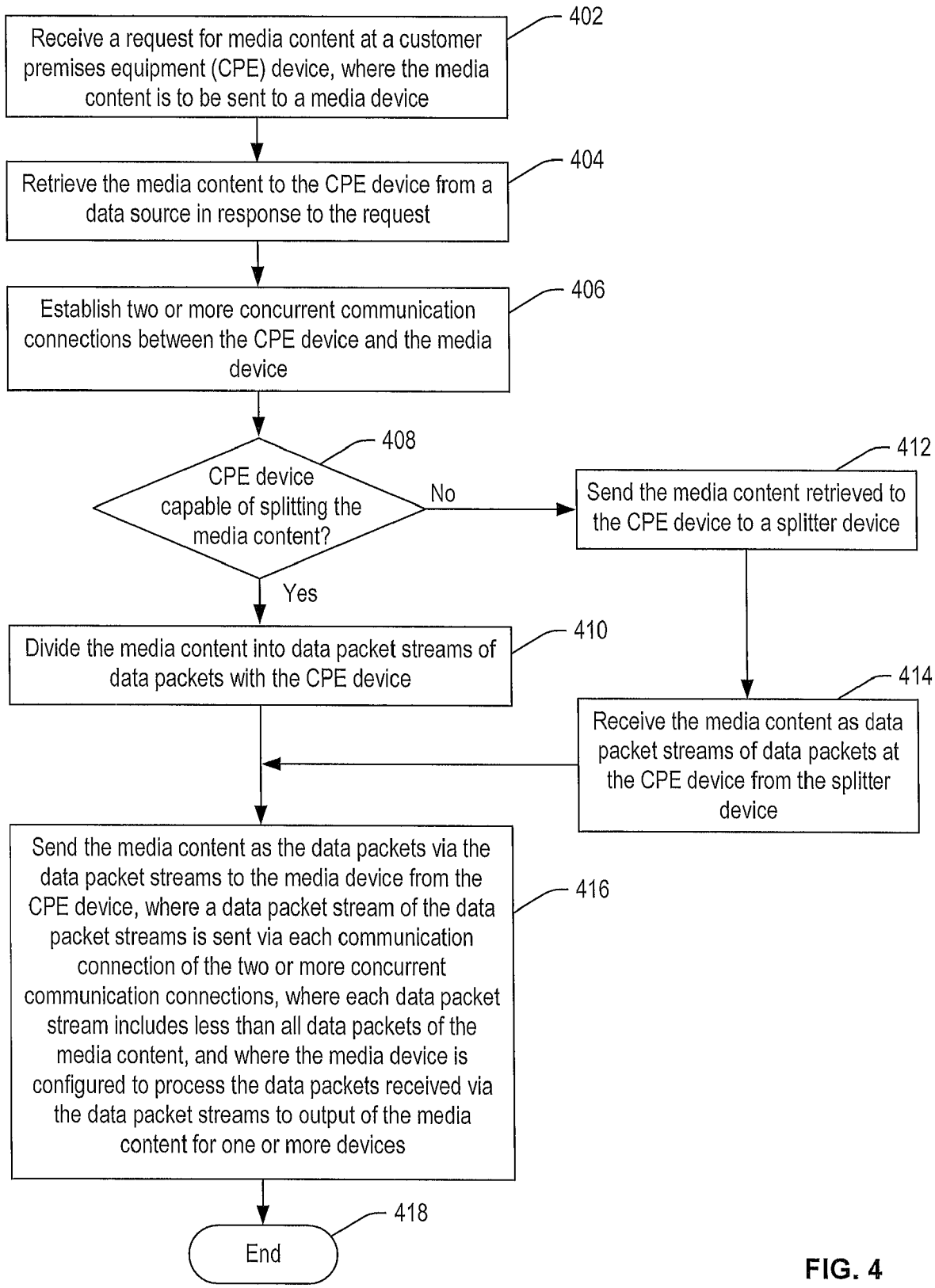
FIG. 4 is a flow chart of a first embodiment of a method for delivery of media content to a media device via multiple data packet streams.

Referring to FIG. 4, a flow chart of a first particular embodiment of a method of delivering media content to a media device via multiple data packet streams is shown. In an embodiment, the method may be performed by a customer premises equipment (CPE) device (e.g., the CPE device 104 depicted in FIG. 1 and the CPE device 206 depicted in FIG. 2).

At 402, the CPE device may receive a request for media content. The request may specify that the media content is to be sent to a media device (e.g., a set-top box device, a television, a digital recorder, a computing device, etc.). In an embodiment, the CPE device receives the request from the media device. The CPE device may retrieve the media content to the CPE device in response to the request, at 404. The media content may be received by the CPE device as a data packet stream of data packets. The media content may be retrieved in response to a media content request sent by the CPE device to a content source. The media content request may be sent to a device coupled to a local area network (LAN) established by the CPE device when the content source is a device coupled to the LAN. The request may be sent to a content source or a service provider device when the content source is external to the LAN.

The CPE device may establish two or more concurrent communication connections to the media device, at 406. The CPE device may determine the number of concurrent connections to establish based at least in part on: a capability of the CPE device to send multiple streams, a capability of the media device to receive multiple concurrent streams, a work load of the CPE device, and a work load of the media device.

Capabilities of the CPE device may determine whether the CPE device is to split the media content retrieved to the media device into two or more data packet streams or whether the CPE device is to send the retrieved media content to a splitter device that divides the media content into two or more data streams. When the CPE device is capable of splitting retrieved media content, at 408, the CPE device may divide the media content into data packet streams of data packets, at 410. The method may continue, at 416.

When the CPE device is not capable of splitting retrieved media content, at 408, the media content retrieved to the CPE device may be sent to a splitter device, at 412. The splitter device may divide the media content received from the CPE device into data packet streams of data packets. The media content as data packet streams of data packets may be received at the CPE device from the splitter device, at 414. The method may continue, at 416.

Figure 5:
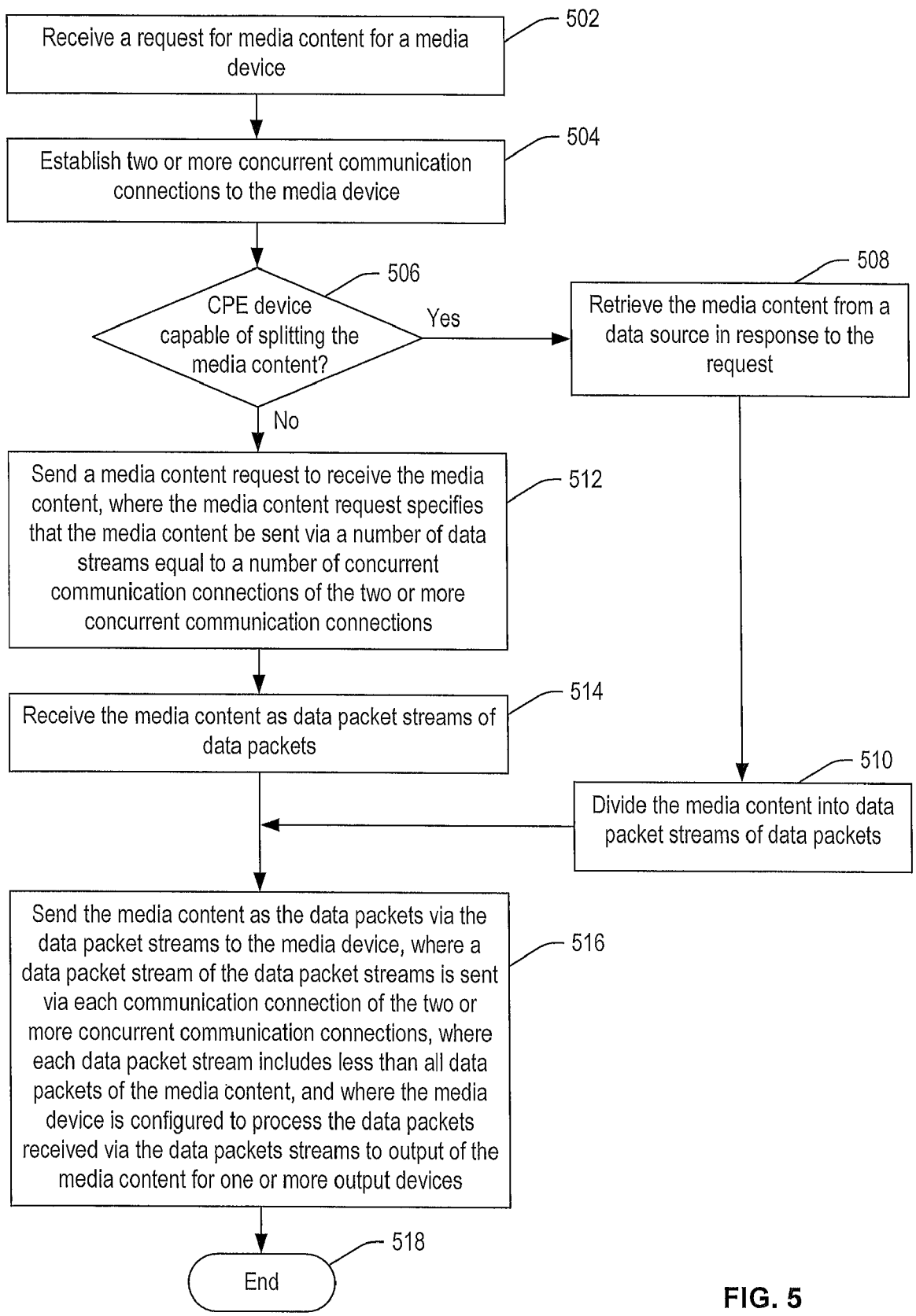
FIG. 5 is a flow chart of a second embodiment of a method for delivery of media content to a media device via multiple data packet streams.

At 416, the media content may be sent as data packets via the data packet streams to the media device from the CPE device. A data packet stream of the data packet streams may be sent via each communication connection of the two or more concurrent communication connections. Each data packet stream may include less than all data packets of the media content. The media device may be configured to process the data packets received via the data packet streams to output the media content for one or more devices Referring to FIG. 5, a flow chart of a second particular embodiment of a method of delivering media content to a media device via multiple data packet streams is shown. In an embodiment, the method may be performed by a customer premises equipment (CPE) device (e.g., the CPE device 104 depicted in FIG. 1, the CPE device 206 depicted in FIG. 2, and the CPE device 304 depicted in FIG. 3).

At 502, the CPE device may receive a first request for media content for a media device (e.g., a set-top box device, a television, a digital recorder, a computing device, etc.). In an embodiment, the CPE device receives the first request from the media device.

The CPE device may establish two or more concurrent communication connections to the media device, at 504. The CPE device may determine the number of concurrent connections to establish based at least in part on: a capability of the CPE device to send multiple streams, a capability of the media device to receive multiple concurrent streams, a work load of the CPE device, and a work load of the media device.

Capabilities of the CPE device, capabilities of service provider devices that send data to the CPE device, capabilities of one or more devices coupled to a local area network (LAN) established by the CPE device, or combinations thereof, may determine whether the CPE device is to split the media content retrieved to the media device or whether the CPE device is to receive the media content as two or more data packet streams. When the CPE device is capable of splitting retrieved media content, at 506, the media content may be received from a data source in response to the first request, at 508. The media content may be received in response to a media content request sent by the CPE device to a source of the media content. The media content request may be sent to a device coupled to a local area network (LAN) established by the CPE device when the source is a device coupled to the LAN. The request may be sent to a content source or a service provider device when the source is external to the LAN. The source may send the media content to the CPE device in response to the media content request.

The retrieved media content may be divided into data packet streams of data packets by the CPE device, at 510. The media content may be divided into a number of data packet streams of data packets. The number of data packet streams may be equal to a number of concurrent communication connections of the two or more concurrent communication connections. During retrieval of the media content, the CPE device may add at least one additional concurrent communication connection when the CPE device is able to accommodate the at least one additional concurrent communication connection, or the CPE device may end at least one of the two or more concurrent communication connections when the CPE device is unable to accommodate the number of concurrent communication connections (e.g., due to additional work demands on the CPE device). The CPE device may adjust division of the media content to reflect changes to the number of concurrent communication connections. The method may continue, at 516.

When the CPE device does not include the capability to split the media content, at 506, the CPE device may send a media content request to receive the media content, at 512. The media content request may specify that the media content be sent via a number of data packet streams equal to the number of concurrent communication connections of the two or more concurrent communication connections.

When the media content is not requested from a device of the LAN, the media content request may be sent by the CPE device to a service provider device that is able to retrieve the media content and divide the media content into the requested number of data packet streams. When the media content is to be retrieved from a particular device of the local area network that is able to send the media content to the CPE device in the requested number of data packet streams (e.g., a computing device capable of sending multiple data packet streams via multiple concurrent communication connections), the request may be sent to the particular device. When the media content is to be retrieved from a particular device of the local area network that is unable to send the media content to the CPE device in the requested number of data streams (e.g., a tablet computer), the request may be sent to a splitter device (e.g., a computing device capable of sending multiple data packet streams via multiple concurrent communication connections). The splitter device may receive the media content from the particular device via the CPE device, and divide the media content into the requested number of data packet streams.

The CPE device may receive the media content as data packet streams of data packets, at 514. The CPE device may add at least one additional concurrent communication connection when the CPE device is able to accommodate the at least one additional concurrent communication connection, or the CPE device may end at least one of the two or more concurrent communication connections when the CPE device is unable to accommodate the number of concurrent communication connections (e.g., due to additional work demands on the CPE device). For example, the CPE device may have the capability to handle ten (10) concurrent communication connections. At a particular time when a request for the media content is received, four (4) of the 10 communication connections may be in use, including a particular communication connection used to made the request. The CPE device may establish 5 additional communication connections to the media device, holding the ability to establish one communication connection in reserve. During retrieval of the media content a first user may request access to first content via the CPE device and a lap top computer. The CPE device may establish a tenth communication connection to accommodate the lap top computer. Also during retrieval of the media content, a second user may request access to second content via the CPE device and a portable communication device (e.g., a mobile communication device or a tablet computer). The CPE device may end one of the six communication connections to the media device to free up a communication connection that the CPE device will use to accommodate the portable communication device. Instead of sending the media content to the media device via six data streams, the CPE device will send the media content to the media device via five data when one of the communication connections to the media device is ended. The media content request may be adjusted to reflect changes to the number of concurrent communication connections. The method may continue, at 516.

At 516, the media content may be sent as data packets via the data packet streams to the media device. A data packet stream of the data packet streams may be sent via each communication connection of the two or more communication connections. The media content may be divided among the data packet streams such that the data packets of each individual data packet stream received at the CPE device are insufficient to produce the media content. The data packets may be divided among the data packet streams such that one or more data packets from each data packet stream are needed to produce each segment of the media content. The method may end, at 518.

Figure 6:
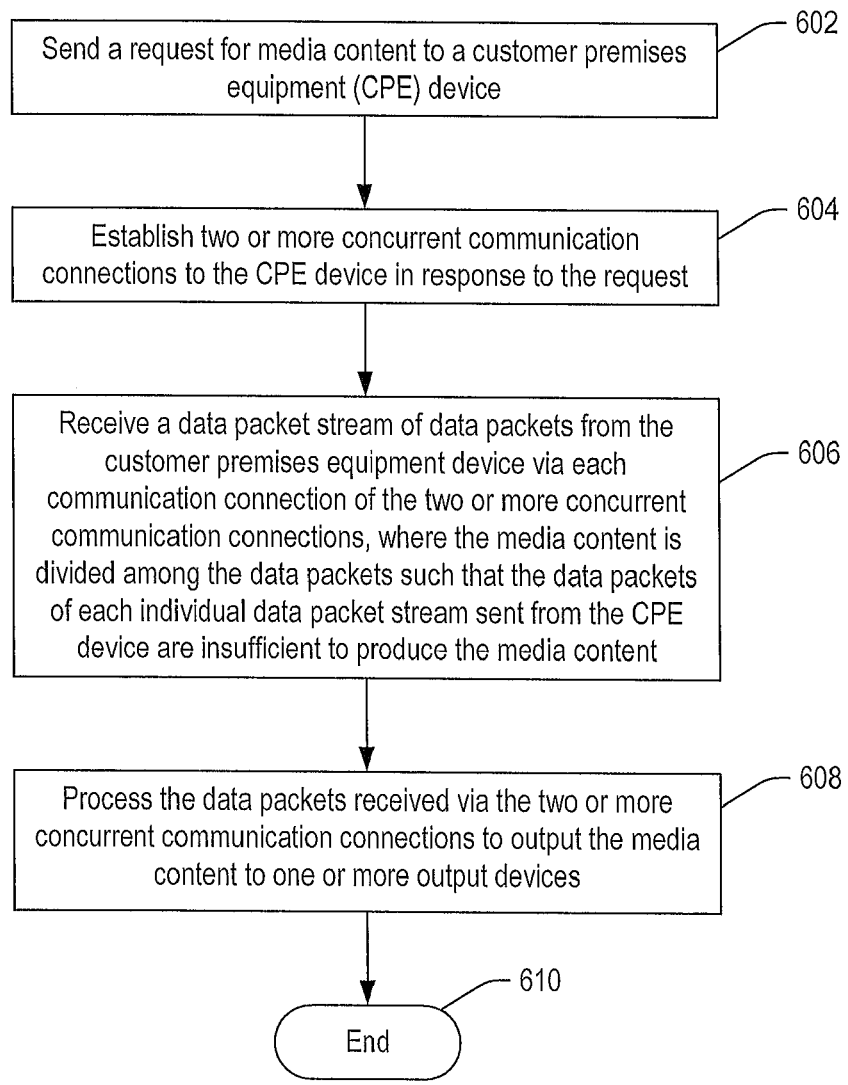
FIG. 6 is a flow chart of a third embodiment of a method for delivery of media content to a media device via multiple data packet streams.

Referring to FIG. 6, a flow chart of a third particular embodiment of a method of delivering media content to a media device via multiple data packet streams is shown. In an embodiment, the method may be performed by a processor of a media device (e.g., the media device 102 depicted in FIG. 1). The media device may be a set-top box device, a television, a computing device, or combination thereof.

At 602, a request for media content is sent to a customer premises equipment (CPE) device. Two or more concurrent communication connections to the CPE device may be established in response to the request, at 604. In an embodiment, the CPE device determines the number of concurrent communication connections to be established, conveys the information to the media device, and the media device and the CPE device establish the number of concurrent connections between particular ports of the media device and the CPE device.

A data packet stream of data packets from the CPE device may be received via each communication connection of the two or more concurrent communication connections, at 606. The media content is divided among the data packets such that the data packets of each individual data packet stream sent from the CPE device are insufficient to produce the media content. The data packets may be divided among the data packet streams such that one or more data packets from each data packet stream are needed to produce each segment of the media content. The data packets may be received from a single router of the CPE device or via multiple routers of the CPE device. Multiple data streams may be sent to the media device via one or more of time division multiple access, frequency division multiple access, and code division multiple access.

The data packets received via the two or more concurrent communication connections may be processed to output the media content to one or more devices, at 608. The one or more devices may include a display device, a sound system, a digital recorder, another device, or combinations thereof. The method may end, at 610.

Various embodiments disclosed herein enable media content to be sent from a CPE device to a media device via two or more concurrent communication connections. The use of two or more concurrent communication connections to send the media content to the media device may increase user satisfaction with receipt of high bandwidth intensive media content (e.g., streaming video) even when the media content is sent to the media device from the CPE device by wireless transmission. Sending the data streams to the network device via multiple concurrent connections may reduce a bandwidth bottleneck between the CPE device and the media device.

Figure 7:
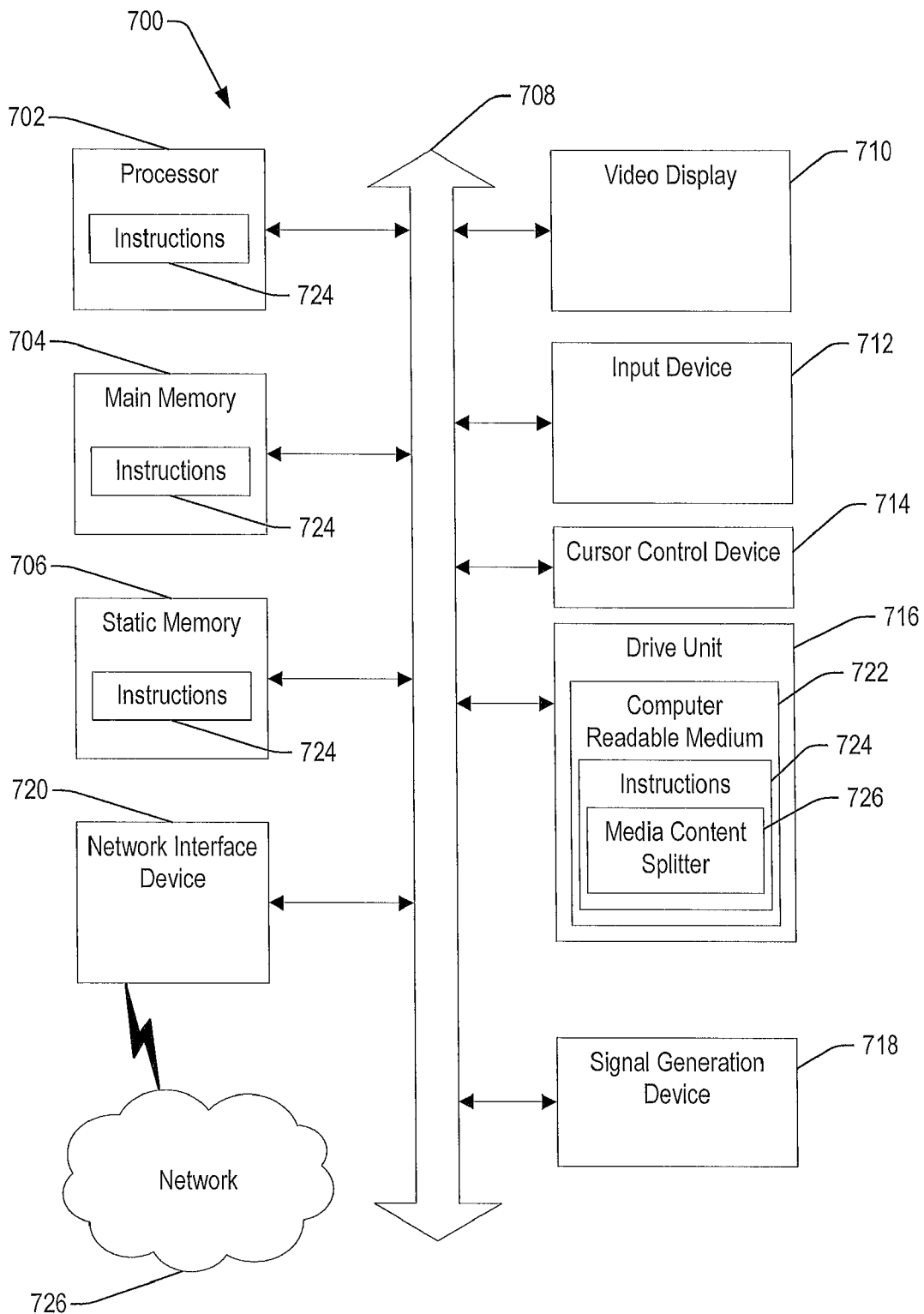
FIG. 7 is a block diagram of an illustrative embodiment of a general computer system.

Referring to FIG. 7, an illustrative embodiment of a general computer system is shown and is designated 700. The computer system 700 may include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the computer system 700 may include or be included within any one or more of the media devices 102, 202, 208, 302, 308, the CPE devices 104, 206, 304, computing devices 138, 140, 246, 346, the splitter device 250, the content sources 144, 248, 334, and the service provider device 336 described with reference to FIGS. 1-3.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 may include a main memory 704 and a static memory 706, which can communicate with each other via a bus 708. As shown, the computer system 700 may further include a video display unit 710, such as a liquid crystal display (LCD), a flat panel display, a solid state display, or a lamp assembly of a projection system. Additionally, the computer system 700 may include an input device 712, such as a keyboard, and a cursor control device 714, such as a mouse. The computer system 700 may also include a drive unit 716, a signal generation device 718, such as a speaker or remote control, and a network interface device 720. Some computer systems 700 may not include an input device (e.g., a server may not include an input device).

In a particular embodiment, as depicted in FIG. 7, the drive unit 716 may include a computer-readable storage device 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable storage devices. The instructions 724 in the drive unit 716, the main memory 704, the static memory 706, the processor 702, or combinations thereof may include a media content splitter 726 to enable division of media content into two or more data packet streams of data packets, where each data packet stream includes a portion of the data packets needed to produce the media content.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage device 722 (e.g., a computer readable medium) that stores instructions 724 or receives, stores and executes instructions 724, so that a device connected to a network 728 may communicate voice, video or data over the network 728. While the computer-readable storage device is shown to be a single storage device, the term "computer-readable storage device" includes a single storage device or multiple storage devices, such as a centralized or distributed database, and/or associated caches and servers that store one or more sets of instructions. The term "computer-readable storage device" shall also include any storage device that is capable of storing a set of instructions for execution by a processor or that cause a computer system to perform any one or more of the methods or operations disclosed herein.

In a particular non-limiting, exemplary embodiment, the computer-readable storage device may include a solid-state memory such as a memory card or other package that houses one or more non-volatile read-only memories. Further, the computer-readable storage device may be a random access memory or other volatile re-writable memory. Additionally, the computer-readable storage device may include a magneto-optical or optical medium, such as a disk or tapes or other storage device. Accordingly, the disclosure is considered to include any one or more of a computer-readable storage device and other equivalents and successor devices, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A media device, comprising:
a processing system including a processor; and
a memory that stores executable instructions that, when executed by the processing system, facilitate performance of operations, the operations comprising:
causing a first plurality of concurrent communication connections to be established with a customer premises equipment device via a local area network, wherein the causing enables the customer premises equipment device to provide media content to the media device over the first plurality of concurrent communication connections;
obtaining, based on the causing, a plurality of streams of data packets from the customer premises equipment device, wherein the media content is divided into the plurality of streams of data packets, and wherein each concurrent communication connection of the first plurality of concurrent communication connections carries a respective stream of data packets of the plurality of streams of data packets; and
during the obtaining, and based on an increase in workload at the customer premises equipment device, causing a first concurrent communication connection of the first plurality of concurrent communication connections to end, such that a second plurality of concurrent communication connections remains with the customer premises equipment device, wherein division of the media content is adjusted for delivery via the second plurality of concurrent communication connections.

2. The media device of claim 1, wherein the operations further comprise during the obtaining, and based on a decrease in the workload at the customer premises equipment device, causing the first concurrent communication connection of the first plurality of concurrent communication connections to become re-enabled, wherein division of the media content is readjusted for delivery via the first plurality of concurrent communication connections.

3. The media device of claim 1, wherein the causing the first plurality of concurrent communication connections to be established is based on the workload at the customer premises equipment device.

4. The media device of claim 1, wherein the causing the first plurality of concurrent communication connections to be established is based on a quantity of concurrent communication connections supported by the customer premises equipment device.

5. The media device of claim 1, wherein the causing the first plurality of concurrent communication connections to be established is based on a quantity of concurrent communication connections supported by the media device.

6. The media device of claim 1, wherein the local area network comprises a wireless network.

7. The media device of claim 1, wherein the obtaining the plurality of streams of data packets from the customer premises equipment device comprises obtaining the plurality of streams of data packets via time division multiple access, frequency division multiple access, code division multiple access, or a combination thereof.

8. The media device of claim 1, wherein the customer premises equipment device receives the media content from a data source.

9. The media device of claim 8, wherein the customer premises equipment device receives the media content from the data source over a third plurality of concurrent communication connections established between the customer premises equipment device and the data source, and wherein the third plurality of concurrent communication connections is equal to the first plurality of concurrent communication connections.

10. The media device of claim 8, wherein the data source is communicatively coupled to the local area network.

11. A non-transitory machine-readable medium, comprising executable instructions that, when executed by a processing system of a media device including a processor, facilitate performance of operations, the operations comprising:

establishing a first plurality of concurrent communication connections with a customer premises equipment device via a local area network to receive media content;

receiving, based on the establishing, a plurality of streams of data packets from the customer premises equipment device, wherein the media content is divided into the plurality of streams of data packets, and wherein each concurrent communication connection of the first plurality of concurrent communication connections delivers a respective stream of data packets of the plurality of streams of data packets; and while receiving the plurality of streams of data packets, and responsive to an increase in workload at the customer premises equipment device or the media device, causing a first concurrent communication connection of the first plurality of concurrent communication connections to end, such that a second plurality of concurrent communication connections remains with the customer premises equipment device, wherein division of the media content is adjusted based on the second plurality of concurrent communication connections.

12. The non-transitory machine-readable medium of claim 11, wherein the establishing the first plurality of concurrent communication connections is based on a quantity of concurrent communication connections supported by the customer premises equipment device.

13. The non-transitory machine-readable medium of claim 11, wherein the establishing the first plurality of concurrent communication connections is based on a quantity of concurrent communication connections supported by the media device.

14. The non-transitory machine-readable medium of claim 11, wherein the local area network comprises a wireless network.

15. The non-transitory machine-readable medium of claim 11, wherein the receiving the plurality of streams of data packets from the customer premises equipment device comprises receiving the plurality of streams of data packets via time division multiple access, frequency division multiple access, code division multiple access, or combinations thereof.

16. A method, comprising:

causing, by a processing system of a media device including a processor, a first plurality of concurrent communication connections to be established with a customer premises equipment device via a local area network, wherein the causing enables the customer premises equipment device to provide media content, obtained from a source device on the local area network, to the media device over the first plurality of concurrent communication connections;

receiving, by the processing system and based on the causing, a plurality of streams of data packets from the customer premises equipment device, wherein the media content is divided into the plurality of streams of data packets, and wherein each concurrent communication connection of the first plurality of concurrent communication connections provides a respective stream of data packets of the plurality of streams of data packets; and responsive to an increase in workload at the customer premises equipment device, causing, by the processing system, multiple concurrent communication connections of the first plurality of concurrent communication connections to end, such that a second plurality of concurrent communication connections remains with the customer premises equipment device, wherein division of the media content is adjusted for delivery via the second plurality of concurrent communication connections.

17. The method of claim 16, further comprising during the receiving, and based on a decrease in the workload at the customer premises equipment device, causing the multiple concurrent communication connections of the first plurality of concurrent communication connections to become re-enabled, wherein division of the media content is readjusted for delivery via the first plurality of concurrent communication connections.

18. The method of claim 16, wherein the customer premises equipment device receives the media content from the source device over a third plurality of concurrent communication connections established between the customer premises equipment device and the source device.

19. The method of claim 18, wherein the third plurality of concurrent communication connections is equal to the first plurality of concurrent communication connections.

20. The method of claim 16, wherein the source device sends the media content to the customer premises equipment device via a public wide area network.

* * * * *